G. A. ANDERSON.
CAR TRUCK.
APPLICATION FILED JAN. 19, 1921.
1,414,917.
Patented May 2, 1922.
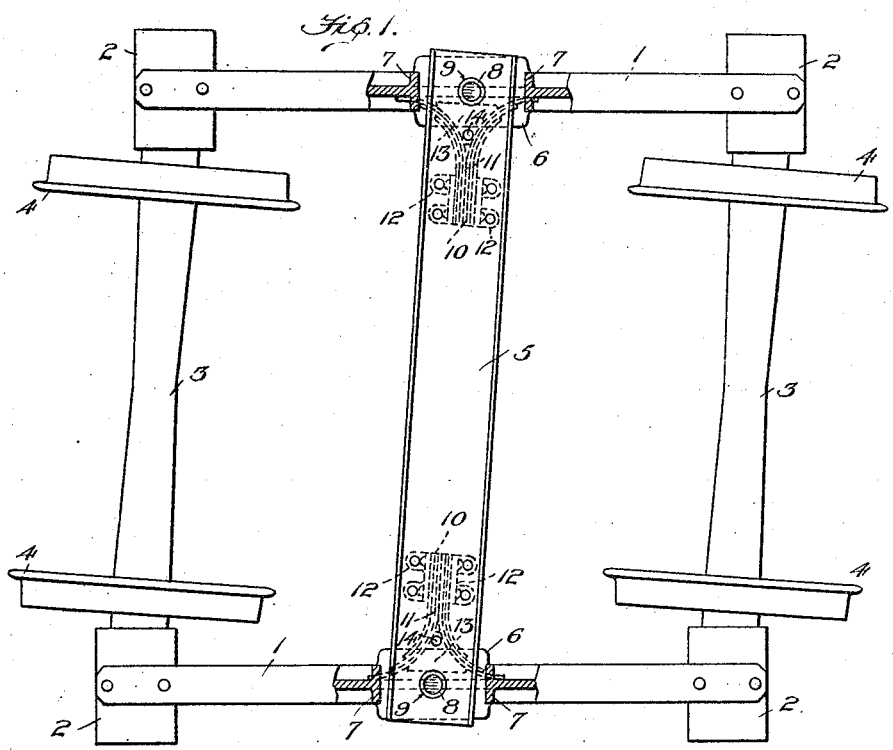
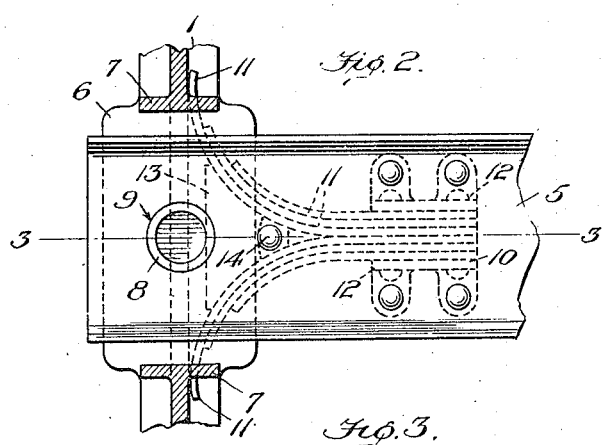
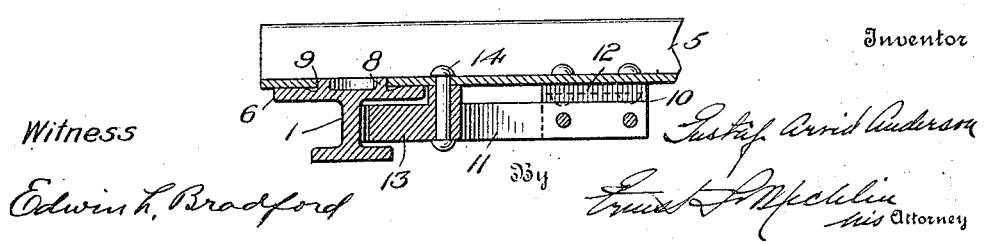

UNITED STATES PATENT OFFICE.

GUSTAF ARVID ANDERSON, OF BALTIMORE, MARYLAND, ASSIGNOR TO THE T. H. SYMINGTON COMPANY, OF NEW YORK, N. Y., A CORPORATION OF DELAWARE.

CAR TRUCK.

1,414,917.   Specification of Letters Patent.   Patented May 2, 1922.

Application filed January 19, 1921. Serial No. 438,476.

*To all whom it may concern:*

Be it known that I, GUSTAF ARVID ANDERSON, a citizen of the United States, residing at Baltimore, in the State of Maryland, have invented certain new and useful Improvements in Car Trucks; and I do hereby declare the following to be a full, clear, and exact description of the invention, such as will enable others skilled in the art to which it appertains to make and use the same.

My invention relates to car trucks and more particularly to a flexible truck structure involving transversely spaced side frame members which are normally maintained in square relation by yielding means permitting them to have a relative displacement longitudinally of the truck in response to external forces such as are applied thereto when the truck passes around a curve or over imperfect switch points or defective rail joints.

The principal object of the invention is to provide efficient, durable and compactly arranged means for normally maintaining the side frames in square relation and for yieldingly resisting relative displacement of said side frames longitudinally of the truck from normal position. The principal feature of the invention by which this object is accomplished consists in mounting upon the means by which the side frames are movably connected transversely of the truck a plurality of leaf spring mechanisms which not only resist relative displacement of the side frames longitudinally of the truck but following such displacement restore them to normal position and tend yieldingly to maintain them in normal relation.

A further feature of the invention consists in providing means for maintaining the leaf spring mechanism under an initial predetermined load.

There are minor features of invention residing in particular details of construction and in special combinations of parts, all as will hereinafter appear.

In the drawings which illustrate the preferred embodiment of the invention, the scope whereof is pointed out in the claims,—

Figure 1 is a view, partly in plan and partly in section, of a car truck embodying the invention, the bolster, which is of the type commonly employed in flexible trucks, being omitted, and the truck parts being shown in a position such as they assume when the truck passes around a curve.

Figure 2 is a detail view, partly in plan and partly in horizontal section, showing the relation of the leaf spring mechanism to one of the side frames and the cross connecting member of the truck.

Figure 3 is a section on the line 3—3, Fig. 2.

In the embodiment of my invention illustrated in the drawings, 1, 1 are transversely spaced side frame members which are adapted to be relatively movable longitudinally of the truck. At its opposite ends each of the side frames 1 is provided with journal boxes 2 receiving the journal ends of the axles 3 upon which the truck wheels 4 are mounted.

The side frames are movably connected transversely of the truck by connecting means 5 which may conveniently be the spring plank element of the truck. The opposite ends of the spring plank 5 extend into the bolster openings 6 of the side frames between the columns 7 thereof. Sufficient clearance is allowed between the edges of the spring plank and the inner faces of the columns 7 to permit the spring plank freely to change its angular relation to the side frames 1 upon a relative longitudinal displacement of the latter from their normal or square position. The bolster (not shown) which also projects into the bolster openings 6 in the usual manner likewise has sufficient clearance between it and the columns 7 of the side frame to allow said bolster to shift its angular relation with respect to the side frames without binding upon the columns. The movable connection between the spring plank 5 and the side frames 1 may be conveniently effected by providing each side frame with a centrally disposed upwardly extending pivot boss 8 which enters a correspondingly formed pivot opening 9 of the spring plank.

The transverse connecting member 5 has mounted thereon, preferably upon the under side thereof and in spaced relation with each other, a plurality of leaf spring means 10 for yieldingly resisting longitudinal displacement of the side frame members from normal. Each of these spring means 10 preferably comprises a plurality of leaf springs 11 rigidly secured at one end to the spring plank 5, by means of a casting 12, and spaced apart or separated at the opposite end so as to engage the inner side of the adjacent frame member 1 on opposite sides of the pivot boss 8. The separation of the spring leaves 11 adjacent the side frame is preferably effected by means of a wedge or spreader 13 which may be secured to the cross connecting member 5 by means of a rivet 14, the wedge being forced in between the leaves 11 of the spring mechanism in the assembly of the parts so as to subject said leaves to an initial predetermined load which must be overcome before any change in the normal angular relation of the side frames 1 and spring plank 5 can occur. By this particular embodiment of my invention the truck may be maintained practically in square under substantially all normal service conditions, but the truck parts will be permitted to yield momentarily under excessive shocks or blows without detriment to the truck structure.

I claim:—

1. In a car truck, the combination with side frame members which are relatively movable longitudinally of the truck, of means for movably connecting said side frame members, and a leaf spring operatively interposed between said connecting means and one of said side frames for yieldingly resisting relative longitudinal displacement of said side frames from normal position.

2. In a car truck, the combination with side frame members which are relatively movable longitudinally of the truck, of means for movably connecting said side frame members, and leaf spring mechanism mounted on said connecting means and engaging one of said side frames for yieldingly resisting relative longitudinal displacement of said side frames from normal position.

3. In a car truck, the combination with side frame members which are relatively movable longitudinally of the truck, of transversely extending means movably connected to each of said side frame members, and a plurality of leaf spring mechanisms mounted on said transversely extending means in spaced relation, each of said spring mechanisms engaging an adjacent side frame member and being adapted to afford yielding resistance to longitudinal displacement of the adjacent side frame member from normal position.

4. In a car truck, the combination with side frame members which are relatively movable longitudinally of the truck, of means for movably connecting said side frame members, and leaf spring means for resisting relative longitudinal displacement of said side frame members from normal position.

5. In a car truck, the combination with side frame members which are relatively movable longitudinally of the truck, of means for movably connecting said side frame members, and leaf spring means for resisting relative longitudinal displacement of said side frame members from normal position, said leaf spring means being subject to an initial predetermined load when the said side frame members and connecting means are in normal position.

6. In a car truck, the combination with side frame members which are relatively movable longitudinally of the truck, of means for movably connecting said side frame members, and leaf spring means for resisting relative longitudinal displacement of said side frame members from normal position, said leaf spring means being secured at one end to said connecting means and its other end being free and bearing upon one of said side frame members.

7. In a car truck, the combination with side frame members which are relatively movable longitudinally of the truck, of means for movably connecting said side frame members, and means for yieldingly resisting relative longitudinal displacement of said side frame members from normal position, said last named means being mounted entirely upon said connecting means intermediate the ends of said side frame members.

8. In a car truck, the combination with side frame members which are relatively movable longitudinally of the truck, of means for movably connecting said side frame members, leaf spring means for yieldingly resisting relative longitudinal displacement of said side frame members from normal position, and means independent of said side frame members for maintaining said leaf spring means under an initial predetermined load.

9. In a car truck, the combination with side frames which are relatively movable longitudinally of the truck, of means for movably connecting said side frame members, and leaf spring means for yieldingly resisting relative longitudinal displacement of said side frame members from normal position, said leaf spring means comprising a plurality of leaf springs which are separated at one end.

10. In a car truck, the combination with side frame members which are relatively movable longitudinally of the truck, of transversely extending means movably connected to each of said side frame members, and a plurality of leaf spring means for yieldingly resisting relative longitudinal displacement of said side frame members from normal position, said spring means being spaced transversely of the truck and arranged adjacent the respective side frame members and each comprising a plurality of leaf springs which are separated at one end.

11. In a car truck, the combination with side frame members, of means for movably connecting said side frame members, and leaf spring means secured to and extending below said connecting means for yieldingly resisting relative longitudinal displacement of said side frame members from normal position.

12. In a car truck, the combination with side frame members which are relatively movable longitudinally of the truck, of means for movably connecting said side frame members, and leaf spring means for yieldingly resisting relative longitudinal displacement of said side frame members from normal position, said leaf spring means being adapted to exert pressure upon the adjacent side frame member below said connecting means.

13. In a car truck, the combination with side frame members which are relatively movable longitudinally of the truck, of a spring plank movably connected at its opposite ends to said side frame members, and a plurality of leaf spring means mounted on said spring plank and respectively adapted to exert pressure on the corresponding side frame member to resist relative longitudinal displacement of the side frame members from normal position.

14. In a car truck, the combination with side frame members which are relatively movable longitudinally of the truck, of a spring plank pivotally connected at its opposite ends to said side frame members, a plurality of leaf spring means mounted on the under side of said spring plank and respectively adapted to exert pressure on the corresponding side frame member to resist relative longitudinal displacement of said side frame members from normal position, and means carried by said spring plank for maintaining said spring means under initial predetermined load.

15. In a car truck, the combination with side frame members which are relatively movable longitudinally of the truck, of a spring plank pivotally connected at its opposite ends to said side frame members, a plurality of leaf spring means mounted on said spring plank and adapted to resist relative longitudinal displacement of said side frame members from normal position, said spring means being spaced transversely of the truck and each comprising a plurality of leaf springs which are separated at one end, and means carried by said spring plank for maintaining said separated relation of the ends of said springs.

16. In a car truck, the combination with side frame members which are relatively movable longitudinally of the truck, of a spring plank pivotally connected at its opposite ends to said side frame members, and a plurality of leaf spring means for yieldingly resisting relative longitudinal displacement of said side frame members from normal position, said spring means being spaced transversely of the truck and arranged adjacent the respective side frame members and each comprising a plurality of leaf springs which are adapted to exert pressure upon the adjacent side frame member on opposite sides of its pivotal connection with said spring plank.

In testimony whereof I affix my signature.

GUSTAF ARVID ANDERSON.